(12) United States Patent
Feng

(10) Patent No.: US 7,770,150 B2
(45) Date of Patent: Aug. 3, 2010

(54) APPARATUS, SYSTEM, AND METHOD FOR SHARING AND ACCESSING DATA BY SCOPES

(75) Inventor: Zhao-hui Feng, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1231 days.

(21) Appl. No.: 11/014,525

(22) Filed: Dec. 15, 2004

(65) Prior Publication Data

US 2006/0129983 A1 Jun. 15, 2006

(51) Int. Cl.
*G06F 9/44* (2006.01)
(52) U.S. Cl. .................... 717/108; 709/219
(58) Field of Classification Search ............... 717/108; 709/219
See application file for complete search history.

(56) References Cited

U.S. PATENT DOCUMENTS

| | | | |
|---|---|---|---|
| 5,692,180 A | 11/1997 | Lee | |
| 6,460,141 B1* | 10/2002 | Olden | 726/4 |
| 6,658,571 B1* | 12/2003 | O'Brien et al. | 726/26 |
| 6,886,041 B2* | 4/2005 | Messinger et al. | 709/226 |
| 6,889,227 B1* | 5/2005 | Hamilton | 707/102 |
| 7,085,834 B2* | 8/2006 | Delany et al. | 709/225 |
| 7,107,592 B2 | 9/2006 | Taylor et al. | |
| 2003/0046406 A1 | 3/2003 | Beisiegel et al. | 709/228 |
| 2003/0093471 A1 | 5/2003 | Upton | 709/203 |
| 2003/0158895 A1 | 8/2003 | Mehra et al. | 709/203 |
| 2003/0163481 A1 | 8/2003 | Blohm | |
| 2003/0221021 A1 | 11/2003 | Kan et al. | 709/315 |
| 2003/0229623 A1 | 12/2003 | Chang et al. | |
| 2004/0019887 A1 | 1/2004 | Taylor et al. | |
| 2004/0078495 A1* | 4/2004 | Mousseau et al. | 710/1 |
| 2004/0158813 A1 | 8/2004 | Xia et al. | 717/116 |
| 2004/0162905 A1 | 8/2004 | Griffin et al. | |
| 2004/0177335 A1 | 9/2004 | Beisiegel et al. | 717/102 |
| 2004/0177352 A1 | 9/2004 | Narayanaswamy et al. | 717/169 |

OTHER PUBLICATIONS

"Accessing Resources in a Location-Independent Manner", 1996-98, http://java.sun.com/j2se/1.4.2.docs/guide/resources/resources.html, retrieved on Feb. 14, 2008.

(Continued)

*Primary Examiner*—Wei Y. Zhen
*Assistant Examiner*—Phillip H Nguyen
(74) *Attorney, Agent, or Firm*—Kunzler Needham Massey & Thorpe

(57) ABSTRACT

An apparatus, system, and method are disclosed for scoped management of software objects. The apparatus includes a receive module, an establish module, and a control module. The receive module receives a request to access a scoped resource. The establish module establishes access to the scoped resource accessible by a plurality of independent objects based on a specified scoping scheme. The control module controls access to the scoped resource in accordance with the specified scoping scheme. Additionally, the apparatus may provide an API for a scoping service. The apparatus, system, and method reduce errors and unexpected results in modular software design in a J2EE software environment as well as other software environments in which modular software design is used.

29 Claims, 7 Drawing Sheets

OTHER PUBLICATIONS

"Class Loader Info", The Jakarta Project, http://tomcat.apache.org/tomcat-4.0-doc/class-loader-howto.html, 1999-2002, retrieved on Feb. 14, 2008.

"Class Loaders", last updated: Jul. 18, 2003 http://publib.boulder.ibm.com/infocenter/wasinfo/topic/com.ibm.websphere.exp.doc/info/ex....

"Client Applications for Integrating a Development Environment with a Web Distributed Authoring (WebDAV) Server", Research Disclosure, Apr. 1999.

John Corwin et al., "MJ: A Rational Module System for Java and it's Applications", Oct. 2003, AMC, pp. 241-254.

Liang et al., "Dynamic Class Loading in the Java Virtual Machine" 1998 AMC, pp. 36-44.

"Mailing list archives", retrieved from http://mail-archives.apache.org/mod_mbox/tomcat-dev/200310.mbox/%3C399E1F52E73BD41194A800D0B74A08AB03400432@skipper.concom.com%3E, on Jul. 30, 2008.

Shangping Ren et al., "System Imposed and Application Compliant Adaptations", Department of Computer Science Illinois Institute of Technology, Proceedings of the 24th International Conference on Distributed Computing Systems Workshops, 2004.

"4.6 General Rules About Deployment," http://developers.sun.com/sw/docs/articles/packaging/packaging.html, pp. 11-12, retrieved on Dec. 7, 2004, available to public Jun. 16, 2003 as per internet archive website at www.archive.org.

Martin, Brian, "Understanding WebSphere 5.0 ClassLoaders", WebSphere Development, WebSphere software, IBM Software, published by at least prior to Dec. 15, 2004.

* cited by examiner

APPARATUS, SYSTEM, AND METHOD FOR SHARING AND ACCESSING DATA BY SCOPES

BACKGROUND OF THE INVENTION

1. Field of the Invention

This invention relates to management of software and data resources in a computing environment and more particularly relates to sharing and accessing data by scopes.

2. Description of the Related Art

Software technology continues to improve. With recent advances in the fields of web programming, data storage systems, personal computers and electronics, and computer networking, associated software programming is becoming more and more complex. One solution to help reduce the complexity of software programming is the adoption of object-oriented and component-based development methodologies. In object-oriented and component-based development a large software code is broken up into smaller objects, components and modules. These smaller portions of the code are self-contained in some instances, and used as building blocks to develop a larger software system. The smaller units are assembled, packaged and deployed to support the composition of multiplatform, multilayer, and multifunction system. Separate handling of software units creates additional complexity in sharing resources such as in-memory data as well as external objects among the deployment units.

FIG. 1 illustrates a common computing environment. Multiple software hosts or application servers, may be networked together to form a cluster. These clustered application servers may share application resources one to another. One application server may host multiple applications. Typically, an application is a composite of multiple modules, each module possibly containing multiple components. Applications are written in a modular format to simplify many aspects of software design. For example, if a developer breaks up an application into modules or components, he needs only to focus on one smaller portion of the application at a time. Another benefit of modularity is the ability to allow multiple developers to work on the application simultaneously.

One drawback of modular applications is the complexity of the final architecture. In some cases, a single application may include several layers of modules and components. For example, an application developed in Java 2 Enterprise Edition (J2EE) may include one or more modules. The modules can be Web modules, EJB modules, Client modules or Resource Adapter modules. Each module may include one or more components such as Servlets, JSP pages, Enterprise Java Beans (EJBs), and the like. Consequently, it becomes necessary to define the scope of each element of the computing system, and determine guidelines for sharing resources according to compatible scopes.

For example, in a J2EE environment, an application server may host an application containing two components in a module. A hit counter is required for each component to record the number of hits on the component. The counter object is shared among all the instances of that component and it is desirable that each component keeps its own counter object without interference from the other. A common implementation technique may keep the counter as a class variable (i.e., a static field of a java class or interface) of Counter class. If the Counter class is packaged in the application, the isolation can be broken and it turns out that the two components share the same counter. When the first component accesses the counter object, it may encounter unexpected values due to the modifications made to shared variable by the second component.

In another example, multiple objects may need to share information between the objects. However, in J2EE a separate class loader may load each object. If the variable that needs to be shared is declared static or local, each instance of the object may only locally modify the variable. For example, two separate web applications may request access to a hit counter object, and specifically to the counter variable of the hit counter object. The web applications need to increment the same hit counter for. If two separate class loaders load the hit counter class, and the counter variable of the hit counter object is declared static, the applications may increment the counter variable of the local instance of the hit counter object, but not share access to the counter variable with the other web object.

In another example, software activity based scoping issues may arise. These may be considered horizontal scoping issues, because the typical hierarchical structure does not apply. For example, an activity, a thread, a transaction, an Hypertext Transfer Protocol (HTTP) session, or the like are considered to by activity oriented. An HTTP session may be created to handle certain web activities. However, some activities may require separate HTTP sessions. If a web application performs certain activities on a web page, but a user requests the application to perform activities that require a new web page, an new HTTP session may be required. In this situation, horizontal scoping is required.

The problems highlighted in the examples above may be amplified in the J2EE environment. Unlike its predecessor Java 2 Standard Edition (J2SE), J2EE utilizes multiple class loaders to access software resources. One application, module, or other component may access a shared resource with its class loader, while a second class loader accesses the same shared resource (i.e., the global variable of the scoped singleton). The first component may not have information regarding actions taken by the second component on the shared resource. Alternatively, two parent objects may desire shared access to a variable, but only get local access to the variable because the J2EE class loaders have created separate instances of the object and associated static or local resource. Therefore, the first and the second components may encounter errors or unexpected results because an object may include static attributes shared between multiple instances of the object.

As a workaround in J2EE, some scoping between objects may be achieved by careful deployment, packaging, and class loader delegation. Scoped deployment includes limiting object deployment to a predefined hierarchical order. For example, if a class variable is to be shared by multiple applications running on the same JVM, the class has to be deployed to the class path of an ancestor class loader of all the application class loaders.

To support the packaging and deployment model, a J2EE server typically uses a hierarchy of class loaders to load classes from different deployment units. The classes used by an application can be loaded by different class loaders in the hierarchy. This aspect of J2EE creates visibility issues at java class level for sharing information among components across deployment units. The class loader delegation model creates scopes for sharing and isolation, however the developers must predetermine the delegation architecture. Such a task may be inordinately time consuming, and intellectually challenging. Typical developers of ordinary skill in the art are not concerned with the intricacies associated with class loader delegation.

Unfortunately, implementation of effective scoping in complicated applications may be difficult or even impossible. Currently two options for scoping exist. Either the developer must define, package, and properly deploy separate instances of each resource to be used within a different scope relying on the class loader hierarchy and delegation model, or implement a custom designed set of objects and methods to associate scope with instantiated objects.

These custom designed solutions tend to be particularly suited to a scoping scheme specific to the scoping problems faced by a developer. Another difficulty associated with the scoping solutions described above is the limited application of each solution. The solutions typically are specific to a single scoping goal. Therefore, the scoping solutions may not apply to every situation in which software object scoping is desirable. It would be useful to provide a scoping framework broad enough to apply to a wide variety of development and runtime applications. Additionally, it would be useful to provide flexible customization of scoping as a plug-in feature of the framework.

From the foregoing discussion, it should be apparent that a need exists for an apparatus, system, and method that provide scoped management for software objects. Beneficially, such an apparatus, system, and method would reduce scope related errors, simplify scoped data sharing and access by providing a broadly applicable, and highly flexible scoping service.

SUMMARY OF THE INVENTION

The present invention has been developed in response to the present state of the art, and in particular, in response to the problems and needs in the art that have not yet been fully solved by currently available software platforms. Accordingly, the present invention has been developed to provide an apparatus, system, and method for scoped management of software objects that overcome many or all of the above-discussed shortcomings in the art.

The apparatus for scoped management of software objects is provided with a logic unit containing a plurality of modules configured to functionally execute the necessary steps of receiving a request to access a scoped resource, establishing access to the scoped resource accessible by a plurality of independent objects based on a specified scoping scheme, and controlling access to the scoped resource in accordance with the specified scoping scheme. These modules in the described embodiments include a receive module, an establish module, and a control module.

In one embodiment, the apparatus is configured to receive a request to access a scoped resource. The apparatus may include an interface module configured to provide an Application Program Interface (API) for associating a scope with a software object. Additionally, an extend module may add one or more scoping schemes dynamically to the apparatus as a plug-in.

In one embodiment, the establish module establishes access to the scoped resource accessible by a plurality of independent objects based on a specified scoping scheme. In one embodiment, the apparatus includes pre-defined scoping schemes that implement common scoping requirements. The specified scoping scheme may include a hierarchical scoping scheme. Alternatively, the specified scoping scheme may include a horizontal scoping scheme. In another embodiment, the establish module may include a lifecycle module configured to manage a scope lifecycle, wherein the lifecycle of the scope is determined by lifecycle events triggered by an action of a calling object.

In one embodiment, the control module controls access to the scoped resource in accordance with the specified scoping scheme. The control module may include a management module configured to manage resources shared by the plurality of independent objects according to policies defined in the specified scoping scheme. In one embodiment, the management module includes an access module configured to access shared information in response to the request from objects, each object having a scope that satisfies the specified scoping scheme. The software objects that share the scoped resource may comprise compatible scopes.

A system of the present invention is also presented for scoped management of software objects. In one embodiment, the system includes an application server, one or more software objects, and a scope service. In one embodiment, the application server is configured to host one or more software objects. The software objects may access a scoped resource. Additionally, the scope service receives a request to access a scoped resource, establishes access to the scoped resource accessible by a plurality of independent objects based on a specified scoping scheme, and controls access to the scoped resource in accordance with the specified scoping scheme.

A method of the present invention is also presented for scoped management of software objects. The method in the disclosed embodiments substantially includes the steps necessary to carry out the functions presented above with respect to the operation of the described apparatus and system. In one embodiment, the method includes receiving a request to access a scoped resource, establishing access to the scoped resource accessible by a plurality of independent objects based on a specified scoping scheme, and controlling access to the scoped resource in accordance with the specified scoping scheme.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
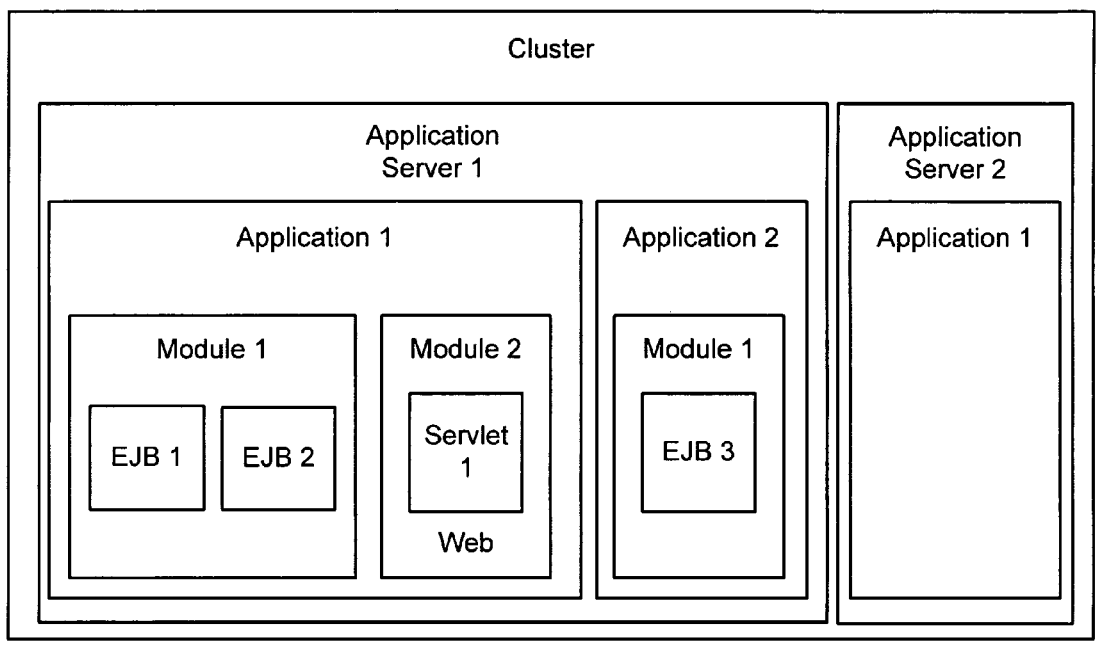
FIG. 1 is a conceptual diagram illustrating a layered software environment.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable storage medium may take any form capable of causing execution of a program of machine-readable instructions on a digital processing apparatus. A computer readable storage medium may be embodied by a compact disk, digital-video disk, a magnetic tape, a Bernoulli drive, a magnetic disk, a punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 2:
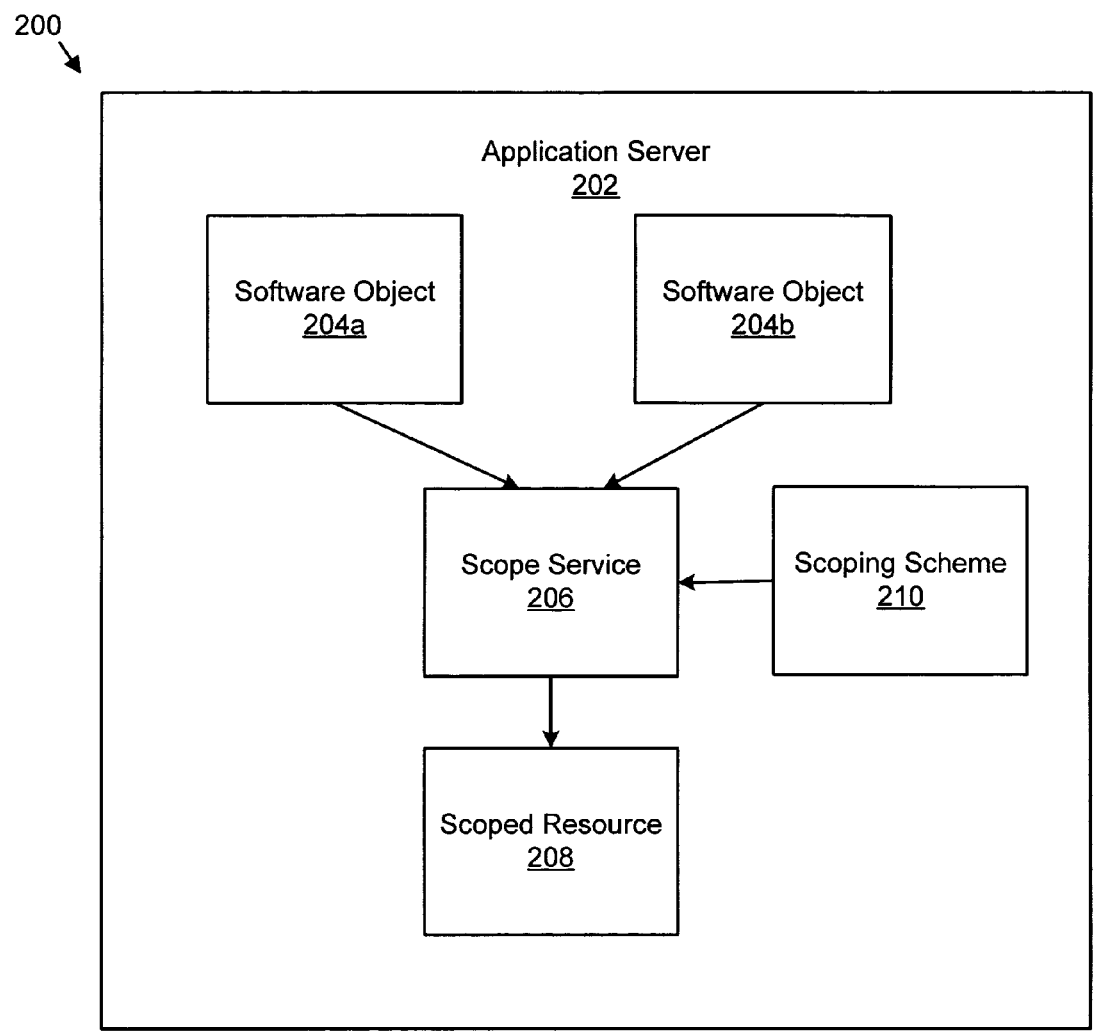
FIG. 2 is a schematic block diagram illustrating one embodiment of a system for scoped management of software objects.

FIG. 2 depicts one embodiment of a system 200 for scoped management of software objects including applications, components, EJBs, and the like. The system 200 may include an application server 202, one or more software objects 204a-b, a scope service 206, a scope resource 208, and a scoping scheme 210. In one embodiment, the application server 202 is configured to host one or more software objects 204, the software objects 204 may be configured to access a scoped resource 208, and the scope service 206 may facilitate scoped access to the scoped resource 208 according to a specified scoping scheme 210.

In certain embodiments of the system 200, a plurality of application servers 202 may comprise a cluster of application servers 202. The cluster may have an associated scope, and each application server 202 may have a different associated scope. In one embodiment, a scope includes an operating environment within which variables and objects exist and may be shared between software callers and objects according to a scoping scheme. Scope, as used herein, includes a characteristic of a resource 208 that describes where the resource 208 may be used in relation to other resources, and what other elements of the system may access the resource 208. In one embodiment, the scope may comprise the namespace of a variable. In another embodiment, the scope may comprise a domain in which a resource 208 operates, or is operated upon.

Information regarding the scope of a scoped resource 208 may be described in a scoping scheme 210. The scoping scheme 210 may define a scoping strategy, scoping policies, a list of resources to be grouped into a scope, sharing policies, and the like. In one embodiment, the scope may be defined by the class of the resource. In another embodiment, the scope may be defined by the structure of the calling hierarchy. Alternatively, the scope may be defined by the activity to be performed by the resource. Additional embodiments of a scope and scoping scheme may be defined in pluggable scoping schemes 210 and implemented by the scope service 206.

A scoping scheme 210 may include a listing of policies and commands required to implement a specified scope. For example, a scoping scheme 210 may call functions or modules required to launch an instance of an object within a specified scope, store shared data within a specified scope, and the like. In one embodiment, the application server 202 defines a scope comprised of applications, objects, and variables defined as public or static which can be accessed by other applications, objects, or variables of the same scope.

In one embodiment, one or more software objects 204 may be configured to access a scoped resource 208. In one embodiment, a software object 204 is an application, module, function, component, or the like. In another embodiment, the software object 204 may include J2EE components. For example, a software object 204 may include a JVM, an EJB, a web servlet, and the like. In certain embodiments, the software object 204 may access a scoped resource 208. Additionally, the software object 204 may pass scoping information as a parameter in a scoped resource call. For example, a J2EE application may call an EJB to perform a task on behalf of the application. The EJB call may include the name of the EJB instance, and the appropriate scope for the EJB instance.

In one embodiment, a scoped resource 208 is data stored by any software object, instance, or variable a developer intends to make available for access to other software code such as a software object 204a. A scoped resource 208 may include data stored by an application, a module, a software component, a function, a software service, a data element, or the like. The scoped resource 208 is scoped so that access to the resource 208 can be controlled according to a scoping scheme 210. A scoping scheme 210 defines rules by which a caller within a first scope can access a scoped resource 208 of the same or different scope.

In one embodiment the scope service 206 receives a request to access a scoped resource 208 from a software object 204a. The request may include parameters such as the name and scope of the desired scoped resource 208. Additionally, the scope service 206 may establish access between the software object 204a and the scoped resource 208. The scope service 206 may also control access to the scoped resource in accordance with a specified scoping scheme 210. The scoping scheme 210 may comprise a default scoping scheme or a user defined scoping scheme. Additional embodiments of the scope service 206 shall be discussed in detail with reference to FIG. 3 and FIG. 4.

Figure 3:
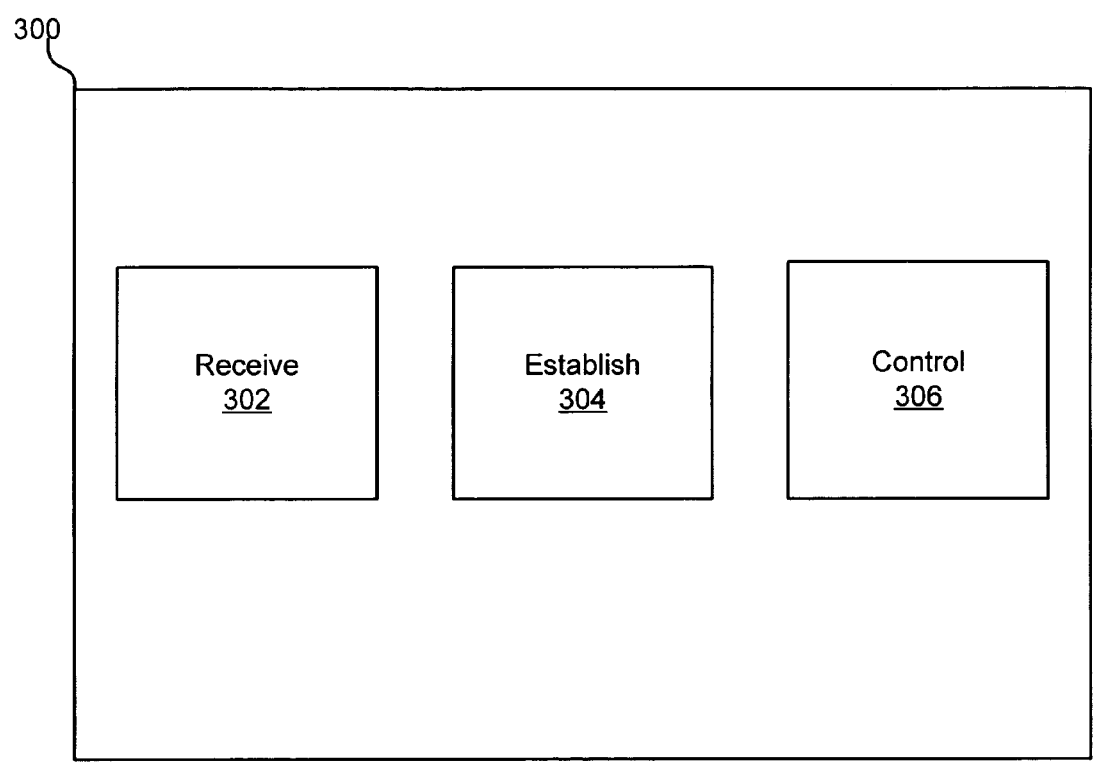
FIG. 3 is a schematic block diagram illustrating one embodiment of an apparatus for scoped management of software objects.

FIG. 3 illustrates one embodiment of an apparatus 300 for scoped management of software objects. The apparatus 300 may include a receive module 302, an establish module 304, and a control module 306. In one embodiment, the apparatus 300 implements scope policies on scoped resources 208 as defined by a scoping scheme 210. The apparatus 300 may implement part of a scope service 206 to interface between a calling software object 204 and a scoped resource 208.

In one embodiment, the receive module 302 receives a request to access a scoped resource 208. The request may originate from a software object 204 calling the scoped resource 208 to perform a predetermined task. In one embodiment, the request is a method or function call including multiple parameters. The parameters may include the name of the scoped resource 208 called, and the name of the scoping scheme 210 to be applied to the resource 208. Additionally, the receive module 302 may identify the location of the scoping scheme 210 to apply to the scoped resource 208 by cross-referencing a list of scoping scheme file locations mapped to scoping scheme names. In one embodiment, the scoping scheme name map may be stored in a registry of scoping schemes.

In one embodiment, the establish module 304 may establish access to a scoped resource 208. The scoped resource 208 may be accessible by multiple independent objects based on a specified scoping scheme 210. In one embodiment, the establish module 304 applies scoping policies to the scoped resource 208 when an instance of the scoped resource 208 is created. In one embodiment, the establish module 304 may create an instance of an object that stores a scoped resource 208, by authorizing a class loader of a specified scope to load an instance of the software object that includes a scoped resource 208 accessible by other independent scoped objects in accordance with scoping policies defined by the scoping scheme 210. In other words, the establish module 304 associates the scope of the class loader with that of the object and associated scoped resources 208. Consequently, references to the scoped resource 208 can be controlled by reviewing the scope of the scoped resource 208 in relation to the scoping scheme 210.

For example, a J2EE class loader for an application may create an instance of an EJB to be used within the scope of the application. Additionally, certain modules within the application may be restricted from accessing the EJB. In such an example, the application represents the software object 204, the EJB includes the scoped resource 208, and the apparatus 300 may establish access by the application 204a to the EJB 208 according to a specified scoping scheme 210. In such an example, the scoping scheme 210 may be a hierarchical scoping scheme 210.

In one embodiment, the apparatus 300 may include pre-defined scoping schemes that implement common scoping requirements. In one embodiment, the pre-defined scoping scheme is a hierarchical scoping scheme that implements scope assignments according to a chain of callers, logical software layers, and the like. For example, a hierarchical scoping scheme may follow an application server, application, module, component, attribute, data priority layout according to the hierarchy of the objects in descending order.

Alternatively, a pre-defined scoping scheme may include a horizontal scoping scheme. The horizontal scoping scheme may define scoping policies based resource activities instead of the organizational structure of the software objects 204. Activities may include transactions, threads, sessions, HTTP sessions, HTTP requests, database requests, and the like. Additional scoping schemes may exist as described in relation to FIG. 4.

Once the establish module 304 establishes access to the scoped resource 208, the control module 306 continues to control access to the scoped resource 208 by restricting access by software objects 204a-b of an incompatible scope, and allowing access by software objects 204a-b of a compatible scope (See FIG. 2). In one embodiment, the control module 306 may control which software objects 204 selected from a group of software objects may access the scoped resource 208. Additionally, the control module 306 may control data storage with respect to the scoped object. For example, the control module 306 may control where information generated by interactions between the scoped resource 208 and the software object 204 is stored.

In another example, the control module 306 may control when a new horizontal scope of an activity based scoped resource 208 needs to be created. In such an example, a scoped resource 208 may be defined by a transaction, thread, session, or the like. A new transaction, thread, or the like may be required in response to certain conditions defined in the specified scoping scheme 210. One example of a horizontal scoping scheme may include an HTTP session. Certain web pages, web servlets and the like maybe accessed within the scope of one HTTP session. However, calls to certain web pages or web servlets may require a new HTTP session to be established. Such determinations may be controlled by the control module 306 as defined by the policies of the specified scoping scheme 210.

Figure 4:
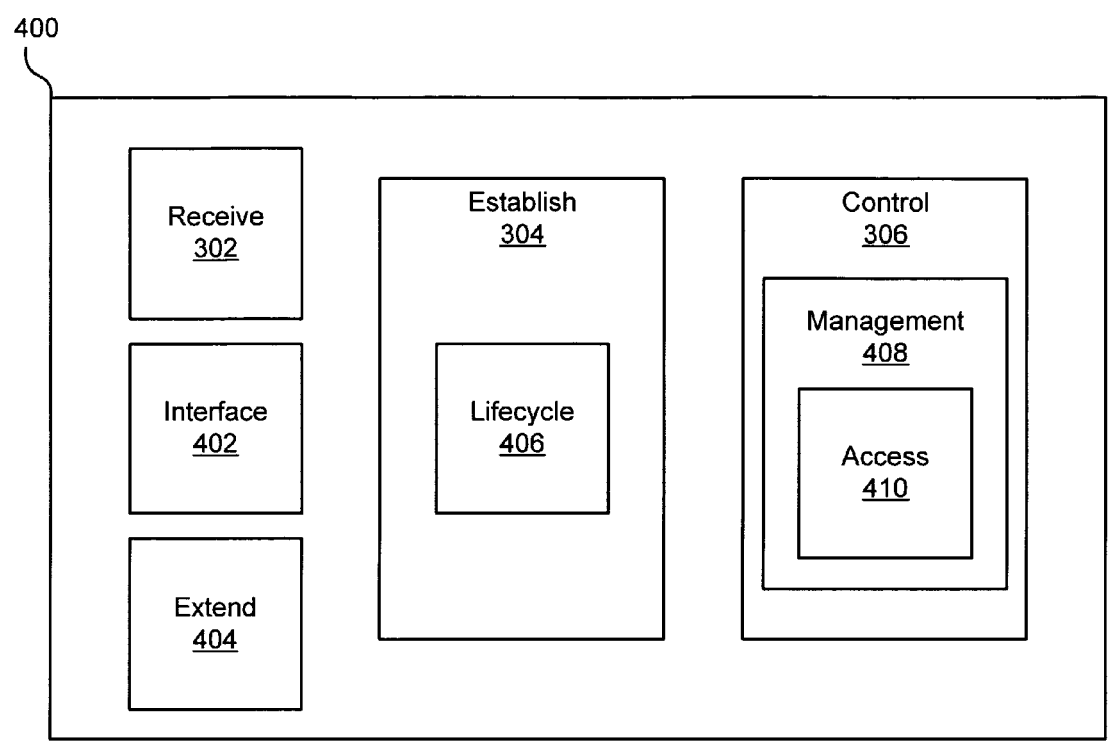
FIG. 4 is a detailed schematic block diagram illustrating one embodiment of an apparatus for scoped management of software objects.

FIG. 4 illustrates one detailed embodiment of an apparatus 400 for scoped management of software objects. In addition the receive module 302, the establish module 304, and the control module 306 as described in relation to FIG. 3, the apparatus 400 may include an interface module 402, an extend module 404, a lifecycle module 406, a management module 408, and an access module 410. In certain embodiments, the described modules may be utilized in a software runtime environment. Alternatively, certain modules may be utilized in a software development environment.

In one embodiment, the interface module 402 provides an Application Program Interface (API) for associating a scope with a software object. The interface module 402 may allow software objects 204a-b (See FIG. 2) to establish scoped access to a scoped resource 208 by making a request to the apparatus 400. In one embodiment, the apparatus 400 comprises a scope service 206. In one example, the scope service 206 may be a service managed by a J2EE container. In certain embodiments, the interface module 402 may require a software object 204 to call a scoped resource 208 using a predefined calling command structure.

In one embodiment, the extend module 404 adds one or more scoping schemes dynamically to the apparatus 400 as a plug-in. The extend module 404 may allow software users and developers to customize the relationship between scope of resources 208 and software objects 204 using pluggable scoping scheme files. In one embodiment, the extend module 404 may accept custom scoping information defined in Extensible Markup Language (XML) files. Alternatively, the scoping information may be defined in text files, graphical user interfaces (GUIs), stored data constructs, and the like. The extend module 404 may accept scoping information defined in the scoping scheme files, and map the scoping scheme file to a scoping scheme name. In an alternative embodiment, the scoping scheme files may be added via the extend module 404 dynamically at run time of an application. For example a customizable scoping scheme may be configured to support persistent data storage or high availability within a scope. For example, a pluggable XML scoping scheme file may include the following:

```
<?xml version="1.0" encoding="UTF-8"?>
<schema
targetNamespace="http://www.ibm.com/xmlns/prod/websphere/sis/"
xmlns="http://www.w3.org/2001/XMLSchema"
xmlns:sis="http://www.ibm.com/xmlns/prod/websphere/sis/">
<element name="scoping" type="sis:Scoping" />
<complexType name="Scoping">
<sequence>
<element name="scheme" type="sis:Scheme" minOccurs="0"
maxOccurs="unbounded" />
</sequence>
</complexType>
<complexType name="Scheme">
<attribute name="name" type="NMTOKEN" /> <!-- The name of the
scoping scheme -->
<attribute name="managerClass" type="NMTOKEN" /> <!-- The name of
the ScopeManager impl
class -->
<attribute name="storeClass" type="NMTOKEN" use="optional" /> <!--
The name of the
ContextStore impl class -->
</complexType>
</schema>
<?xml version="1.0" encoding="UTF-8"?>
<sis:scoping
xmlns:sis="http://www.ibm.com/xmlns/prod/websphere/sis/"
xmlns:xsi="http://www.w3.org/2001/XMLSchema-instance"
xsi:schemaLocation="http://www.ibm.com/xmlns/prod/websphere/sis/
../model/sis.xsd ">
<scheme name="J2EE"
managerClass="com.ibm.websphere.sis.j2ee.J2EEScopeManager" />
<schemename="TRANSACTION"
managerClass="com.ibm.websphere.sis.transaction.Transaction
ScopeManager" />
<scheme name="THREAD"
managerClass="com.ibm.websphere.sis.thread.ThreadScopeManager"
weakReference="true" />
</sis:scoping>
```

The establish module 304 may include a lifecycle module 406. The establish module 304 may trigger a class loader to load an instance of an object and associated scoped resource 208 for access by a calling software object 204a-b. In one embodiment, the lifecycle module 406 manages the scope lifecycle. A scope lifecycle begins with the creation of a scope, and ends with the destruction of the scope. Scope lifecycle describes the period of time and events that occur during the existence of a scope. Lifecycle events triggered by an action of a calling object may determine the lifecycle of a scope. In one embodiment, lifecycle events include scopeCreated( ) and scopeDestroyed( ) commands issued by a caller. Alternatively the lifecycle events may be triggered by other actions of a calling object including requests to access a scoped resource 208. In certain embodiments, the lifecycle module 406 may include a scope event listener to recognize the lifecycle events. The lifecycle of the scoped resource 208 may be determined by the lifecycle of the enclosing scope.

In one embodiment, the control module 306 includes a management module 408. The management module 408 manages resources shared by the plurality of independent objects according to policies defined in the specified scoping scheme 210. In one embodiment, the management module retrieves a slot for the scoped resource 208. In one embodiment, a slot is a storage space dedicated to storage of variables and other data for the scoped resource 208. The management module 408 may control access to the scoped resource 208 by controlling access to information stored or to be stored in the slot. Additionally, the management module 408 may identify the scope of the calling software object 204 to determine allowable interactions between the software object 204 and the scoped resource 208.

For example, a software object 204a may request access to a scoped resource 208. In one embodiment, the software object 204a is a web application and the scoped resource 208 is data associated with a web servlet. The establish module 304 may establish access to the web servlet 208 by triggering a web servlet class loader to load an instance of the web servlet 208 in accordance with scoping policies defined by the specified scoping scheme 210. The control module 306 may then continue to control access by the web application 204a to the web servlet 208 by limiting access to restricted attributes of the web servlet 208 and allowing access to shared attributes of the web servlet 208. In such an example, attributes defined as local may be restricted, while other attributes may be shared.

In one embodiment, the management module 408 includes an access module 410. The access module 410 accesses shared information in response to a request from objects, each object 204 having a scope that satisfies the specified scoping scheme 210. If the management module 408 does not determine that the scope of the calling object 204 satisfies the specified scoping scheme 210, the access module 410 does not access the scoped resource 208 or information stored for the scoped resource in the shared data slot. If the management module 408 does approve access between the object 204 and the scoped resource 208, the access module may store, modify, or retrieve shared data stored in the slot for either the scoped resource 208 or the software object 204.

Figure 5:
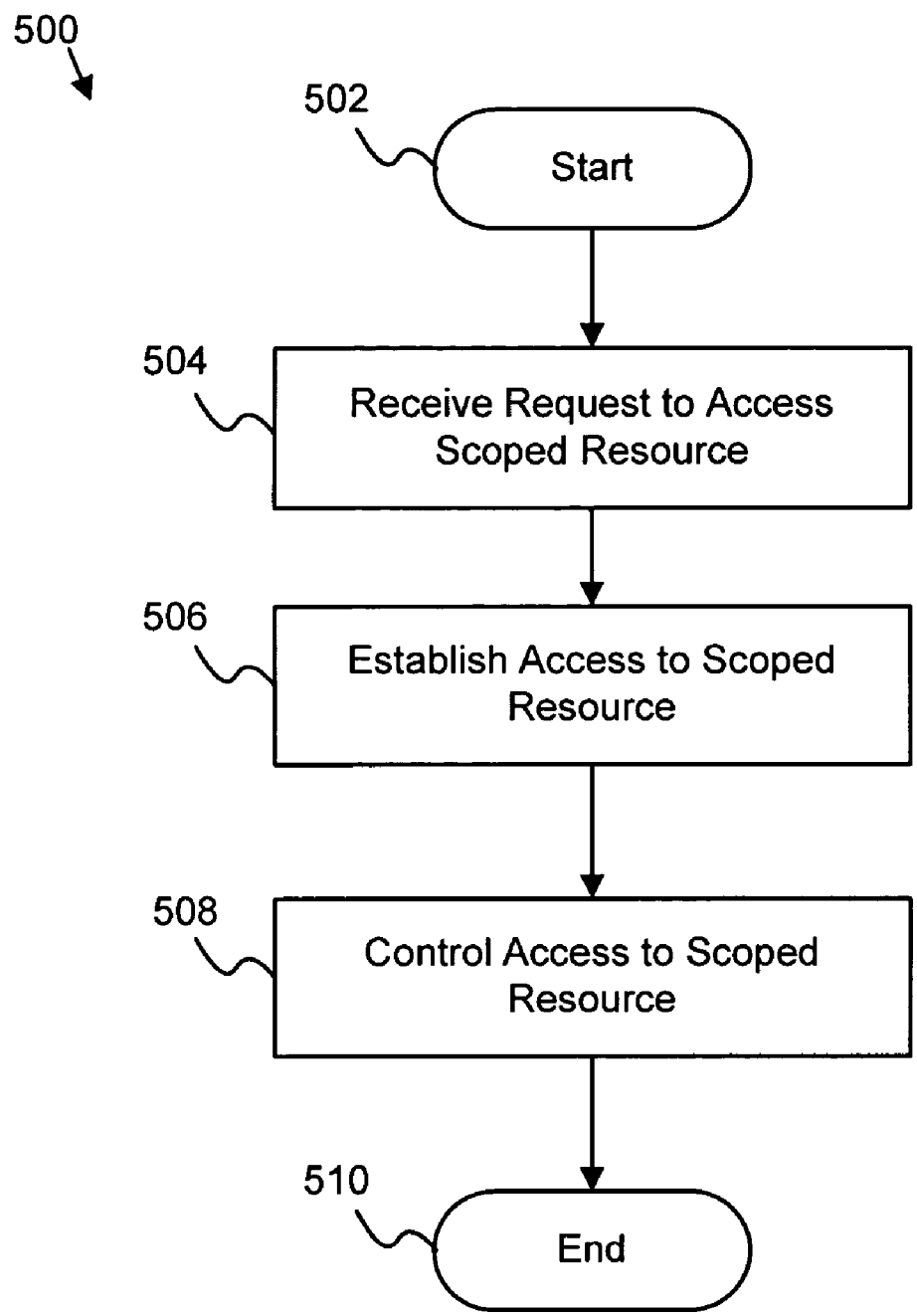
FIG. 5 is a schematic flow chart diagram illustrating one embodiment of a method for scoped management of software objects.

FIG. 5 illustrates one embodiment of a method 500 for scoped management of software objects. In one embodiment, the method 500 starts 502 when the receive module 302 receives 504 a request to access a scoped resource 208 from a software object 204. The establish module 304 then establishes 506 access to the scoped resource 208. In one embodiment, access is established by instantiating an instance of the scoped resources 208 that inherits from a parent class having an associated scope. The control module 306 then controls 508 access to the scoped resource and the method 500 ends. In one embodiment, the establish module 304 establishes 506 access according to a specified scoping scheme 210, and the control module 306 controls 308 access to the scoped resource 208 according to the specified scoping scheme 210.

Figure 6:
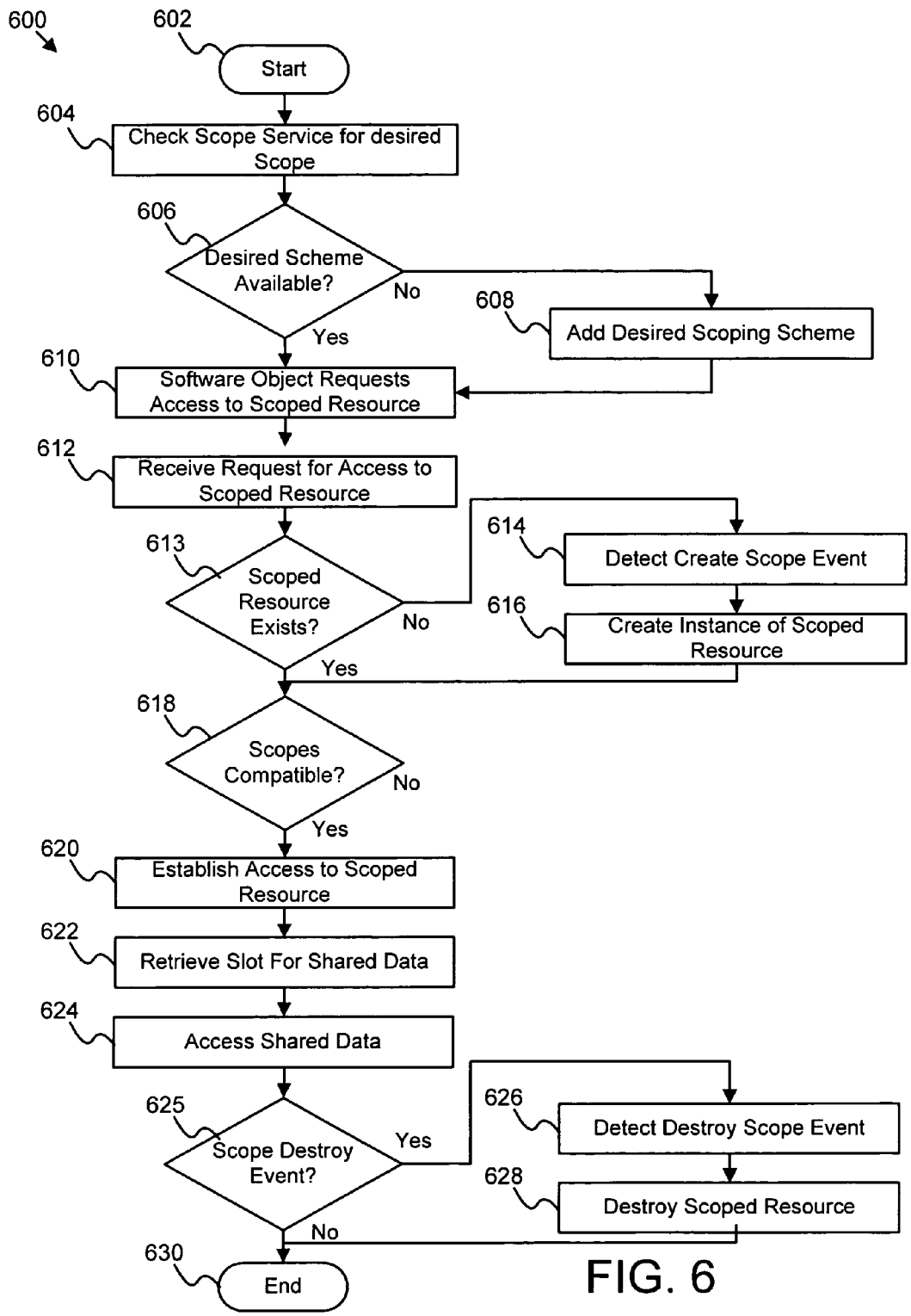
FIG. 6 is a detailed schematic flow chart diagram illustrating one embodiment of a method for scoped management of software objects.

FIG. 6 illustrates another embodiment of a method 600 for scoped management of software objects. In one embodiment, the method 600 starts 602 by checking 604 the scope service 206 for the desired scope. If the desired scoping scheme 210 is not available 606, then the extend module 404 is used to add 608 the desired scoping scheme 210 to the scope service 206. If the desired scheme is available 606, then the software object 204 requests 610 access to the scoped resource 208. In one embodiment, the software object 204 makes the request using the interface module 402. Alternatively, the receive module 302 may receive 612 the request for access to the scoped resource directly according to a predefined call using the scope service API.

When the request is received 612, a determination 613 is made whether the scoped resource 208 exists. If not, the lifecycle module 406 may detect 614 a create scope event. The lifecycle module 406 may then create 616 an instance of the scoped resource 208, since one does not already exist. Alternatively, the software object 204 may request access to shared data of the scoped resource 208. If the scoped resource 208 exists, a determination is made whether the scope of the calling software object 204 and the scoped resource 208 are compatible 618, then the establish module 304 may establish 620 access to the scoped resource 208. In one embodiment, the management module 408 may retrieve 622 a slot for shared data. The access module 410 may then access 624 shared data stored in the slot. In an alternative embodiment, the software object 204 may request 610 access directly to shared information stored in a storage slot associated with a scoped resource of compatible scope. In such an embodiment, the access module 410 may access 624 the shared data directly for the software object 204.

If the scope of the software object 204 and the scoped resource 208 are not compatible 618, the request is rejected. If a scope destroy event occurs 625, the lifecycle module 406 may detect 626 the destroy scope event and destroy 628 the scoped resource 208 and the method ends 630. The lifecycle module 406 may detect 626 a destroy scope event when the scoped object 208 is naturally or manually destroyed. The lifecycle module 406 then destroys 628 the scoped resource and the method 600 ends 630.

Figure 7:
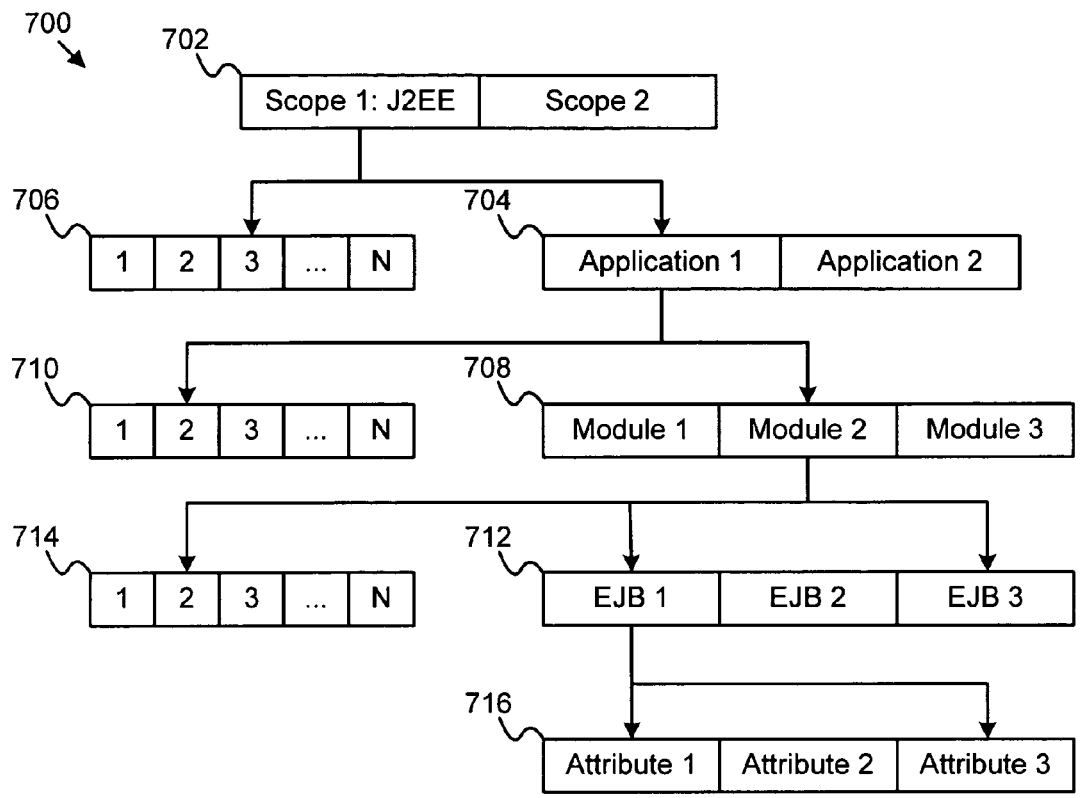
FIG. 7 is a conceptual diagram illustrating one example of a hierarchical scoping scheme.

FIG. 7 illustrates one example of a hierarchical scoping scheme 700. The scope may be defined as an object such as a J2EE container 702. In such an example, the J2EE components may access either an application 704, or application data 706 directly. An application 704 may access one or more modules 708 or shared module data 710. Additionally, the modules 708 may access EJBs 712 or shared EJB data 714. EJBs 712 may access one or more attributes 716. An attribute is a named object within a context for a given scope. For example, "EBJ1" may have multiple objects to be shared in the "Component/ejb1" scope. These can be achieved by using attributes like "Attribute1" and "Attribute2". The attributes can be accessed using the name of the context. In such an example, the hierarchical scoping scheme 700 is designed to manage scope between the multiple hierarchical layers of J2EE components, objects, and resources as described in relation to FIG. 1.

For example a call written in Java to a J2EE counter object 702 may include the following commands:

Map context=sharingManager.getContext ("J2EEPackaging", "Application");
Integer counter=(Integer) context.get("counter");
counter=new Integer(counter.intValue( )+1);
context.put("counter", counter);

In such an example, a Map type variable context is assigned the results of a call to a getContext( ) command of a sharing manager. In this example, the sharing manager is one embodiment of the management module 408. Then, an integer type variable "counter" is assigned to the results of context.get( ) call. The context.get( ) call represents access to the scoped resource 208 by the access module 410. Next, the value of the "counter" variable is incremented. Then, the value of the original "counter" variable is replaced by the incremented value.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Beneficially, the scope service 206, the associated system, apparatus, and method reduce the number of scope related errors typically inherent to modular software design. Providing the API for the scoping service makes design and implementation of custom scoping schemes much simpler. Developers will not be required to manage the scope of each attribute, variable, object, and the like directly. The scoping service 206 may handle scoping issues independently. Use of the scoping service 206 may reduce development time and increase software performance.

What is claimed is:

1. An apparatus, the apparatus implemented on a processor and a memory programmed for sharing and accessing data by scopes, the apparatus comprising:

a receive module configured to receive a software function call from a calling software object to access a scoped resource comprising data stored by a software object, the data configured for access by a plurality of independent software objects;

an establish module configured to establish access to the scoped resource by the calling software object in response to a determination based on scope parameters provided by the calling software object that the calling software object is associated with a scope compatible with a specified scoping scheme for the scoped resource, the scope comprising a characteristic of a resource that describes availability of the resource in relation to other resources, the scoped resource accessible by the plurality of independent software objects based on the specified scoping scheme, the specified scoping scheme comprising sharing policies and rules governing access to one or more scoped resources in a scope, the scope comprising a namespace that defines one or more scoped resources, the namespace having boundaries that are controlled by the specified scoping scheme; and a control module configured to control access to the scoped resource in accordance with the specified scoping scheme, wherein the control module allows software objects with a compatible scope to access the scoped resource.

2. The apparatus of claim 1, further comprising an interface module configured to provide an Application Program Interface (API) for associating a scope with a software object.

3. The apparatus of claim 1, further comprising an extend module configured to add one or more scoping schemes dynamically to the apparatus as a plug-in.

4. The apparatus of claim 1, further comprising pre-defined scoping schemes that implement common scoping requirements.

5. The apparatus of claim 1, wherein the specified scoping scheme comprises a hierarchical scoping scheme.

6. The apparatus of claim 1, wherein the specified scoping scheme comprises a horizontal scoping scheme.

7. The apparatus of claim 1, wherein the establish module further comprises a lifecycle module configured to manage a scope lifecycle, the scope lifecycle comprising a period of time the scope exists, wherein the lifecycle of the scope is dynamically determined by lifecycle events triggered by one or more of an action and a command of a calling software object.

8. The apparatus of claim 1, wherein the control module further comprises a management module to manage resources shared by the plurality of independent software objects according to policies defined in the specified scoping scheme.

9. The apparatus of claim 8, wherein the management module further comprises an access module configured to access shared information in response to software function calls from the plurality of independent software objects, each independent software object having a scope that satisfies the specified scoping scheme.

10. The apparatus of claim 1, wherein the software objects that share the scoped resource comprise compatible scopes.

11. A system to for sharing and accessing data by scopes, the system comprising:
   an application server comprising a processor and memory, the application server configured to host one or more software objects;
   one or more software objects configured to access a scoped resource; and
   a scope service executing on the application server, the scope service configured to,
      receive a software function call from a calling software object to access a scoped resource comprising data stored by a software object, the data configured for access by a plurality of independent software objects,
      establish access to the scoped resource by the calling software object in response to a determination based on scope parameters provided by the calling software object that the calling software object is associated with a scope compatible with a specified scoping scheme for the scoped resource, the scope comprising a characteristic of a resource that describes availability of the resource in relation to other resources, the scoped resource accessible by the plurality of independent software objects based on the specified scoping scheme, the specified scoping scheme comprising sharing policies and rules governing access to one or more scoped resources in a scope, the scope comprising a namespace that defines one or more scoped resources, the namespace having boundaries that are controlled by the specified scoping scheme, and
      control access to the scoped resource in accordance with the specified scoping scheme, wherein software objects with a compatible scope are allowed to access the scoped resource.

12. The system of claim 11, wherein the scope service is further configured to provide an Application Program Interface (API) for associating a scope with a software object.

13. The system of claim 12, wherein the scope service is further configured to add one or more scoping schemes dynamically to the scope service as a plug-in.

14. The system of claim 13, wherein the scope service comprises pre-defined scoping schemes that implement common scoping requirements.

15. The system of claim 14, wherein the specified scoping scheme comprises a hierarchical scoping scheme.

16. The system of claim 15, wherein the specified scoping scheme comprises a horizontal scoping scheme.

17. The system of claim 16, wherein the scope service is further configured to manage a scope lifecycle, wherein the lifecycle of the scope is determined by lifecycle events triggered by an action of a calling software object.

18. The system of claim 17, wherein the scope service is further configured to manage resources shared by the plurality of independent software objects according to policies defined in the specified scoping scheme.

19. The system of claim 18, wherein the scope service is further configured to access shared information in response to software function calls from the plurality of independent software objects, each independent software object having a scope that satisfies the specified scoping scheme.

20. The system of claim 19, wherein the software objects that share the scoped resource comprise compatible scopes.

21. A computer readable storage medium tangibly embodying a program of machine-readable instructions executable by a digital processing apparatus to perform operations for sharing and accessing data by scopes, the operations comprising:
   an operation to receive a software function call from a calling software object to access a scoped resource comprising data stored by a software object, the data configured for access by a plurality of independent software objects;
   an operation to determine based on scope parameters provided by the calling software object whether the calling software object is associated with a scope compatible with a specified scoping scheme for the scoped resource, the scope comprising a characteristic of a resource that describes availability of the resource in relation to other resources, the specified scoping scheme referenced by cross-referencing a list of scoping scheme file locations mapped to scoping scheme names;
   an operation to establish access to the scoped resource by the calling software object in response to a determination that the calling software object has a scope compatible with the specified scoping scheme for the scoped resource, the scoped resource accessible by the plurality of independent software objects based on the specified scoping scheme, the specified scoping scheme comprising sharing policies and rules governing access to one or more scoped resources in a scope, the scope comprising a namespace that defines one or more scoped resources, the namespace having boundaries that are controlled by the specified scoping scheme;
   an operation to control access to the scoped resource in accordance with the specified scoping scheme, wherein the operation to control access allows software objects with a compatible scope to access the scoped resource; and
   an operation to manage a scope lifecycle, the scope lifecycle comprising a period of time the scope exists, wherein the lifecycle of the scope is dynamically determined by lifecycle events triggered by one or more of an action and a command of a calling object.

22. The computer readable storage medium of claim 21, wherein the instructions further comprise an operation to provide an Application Program Interface (API) for associating a scope with a software object.

23. The computer readable storage medium of claim 21, wherein the instructions further comprise an operation to add one or more scoping schemes dynamically to a list of scoping schemes as a plug-in.

24. The computer readable storage medium of claim 21, wherein the instructions further comprise an operation to include pre-defined scoping schemes that implement common scoping requirements.

25. The computer readable storage medium of claim 21, wherein the specified scoping scheme comprises a hierarchical scoping scheme.

26. The computer readable storage medium of claim 21, wherein the specified scoping scheme comprises a horizontal scoping scheme.

27. The computer readable storage medium of claim 21, wherein the instructions further comprise an operation to manage resources shared by the plurality of independent software objects according to policies defined in the specified scoping scheme.

28. The computer readable storage medium of claim 21, wherein the instructions further comprise an operation to access shared information in response to software function calls from the plurality of independent software objects, each independent software object having a scope that satisfies the specified scoping scheme.

29. The computer readable storage medium of claim 21, wherein the software objects that share the scoped resource comprise compatible scopes.

* * * * *